United States Patent [19]

Wilson

[11] 3,902,127

[45] Aug. 26, 1975

[54] ELECTRONIC CIRCUIT AND TECHNIQUE FOR EXTRACTING A VIDEO SIGNAL FROM AN ARRAY OF PHOTODETECTORS

[75] Inventor: Rosser S. Wilson, Berkeley, Calif.

[73] Assignee: Ball Computer Products, Inc., Oakland, Calif.

[22] Filed: Nov. 29, 1973

[21] Appl. No.: 420,320

[52] U.S. Cl. ................ 328/127; 328/151; 307/229; 307/310

[51] Int. Cl. ................ G06g 7/18

[58] Field of Search ........... 328/151, 127, 104, 106; 307/229, 310; 250/209, 556

[56] References Cited

UNITED STATES PATENTS

| | | | |
|---|---|---|---|
| 2,922,151 | 1/1960 | Reiling | 340/347 AD |
| 3,216,005 | 11/1960 | Hoffman et al. | 340/347 AD |
| 3,316,492 | 4/1967 | Mott et al. | 328/151 X |

*Primary Examiner*—Michael J. Lynch
*Assistant Examiner*—B. P. Davis
*Attorney, Agent, or Firm*—Limbach, Limbach & Sutton

[57] ABSTRACT

A video extraction circuit suitable for a monolithic array of photodetectors which are sequentially connected through individual MOS gates one at a time in response to a clock switching signal to a common video signal line. The signal in the output video line is integrated over recurring periods wherein each integration period straddles in time the MOS gate switching clock pulse, with the output of the integrator being sampled once each integration period after the termination of its associated MOS switching clock pulse. The integrator is directly coupled to the photoarray video signal line and to an analog-to-digital converter. An overall extraction circuit is provided with a minimum number of components and a very high speed that is particularly adapted to rapid scanning of visual information by the array of photodetectors, such as in an optical-character reading system.

7 Claims, 2 Drawing Figures

ELECTRONIC CIRCUIT AND TECHNIQUE FOR EXTRACTING A VIDEO SIGNAL FROM AN ARRAY OF PHOTODETECTORS

BACKGROUND OF THE INVENTION

This invention relates generally to a technique and electronic circuit implementation thereof for extracting a signal from a noisy environment with high speed, and more particularly to a technique and electronic implementation thereof for extracting a video signal from an output of a photodetector array wherein each photodetector is time sequentially connected by a semiconductor switching element to a common output.

The use of scanned photodetector arrays to dissect an optical field is a technique employed in a large number of applications. One of these applications occurs as part of an optical-character reader wherein alphanumeric characters are scanned linearly by a large number of photodetectors. Information is obtained from each photodector as to whether it is observing a white or a dark area. This information is processed in a manner to identify which of a large number of alphanumeric characters of a particular font is being scanned by the array of photodetectors. The recognized character is then displayed or printed either at the site whereat the character is being scanned, or at a remote location.

A number of such photocell arrays are available commercially from the Reticon Corporation of Mountain View, California. A standard size array is a straight line row of 128 individual photodetectors occurring in a distance of less than one-half inch. Such a photodetector array is fabricated on a single silicon slice along with additional associated circuit elements if desired. A particular photoarray that is considered in connection with the particular example of the present invention described hereinafter is the Reticon RL-128L device. This device includes a shift register arrangement for time sequentially gating the MOS switches associated with the individual photodetectors. The MOS switches are connected to single video output lines, thereby resulting in a serial video output wherein a signal proportional to the light level striking each of the photodetectors occurs time sequentially. It should be noted that the RL-128L actually employs two independent interleaved rows of 64 photodiodes and companion switches and registers. However, it is convenient to regard the device as a single linear array by suitably arranging the clocking of the two registers and by tying together the two video lines.

Because of inevitable undesirable capacitive coupling between the switching pulse lines of the photodetector chip and the video output line, the signal at the single video output line carries a component of the switching pulses as undesirable noise in the background of the desired video signal. This undesired capacitive coupling arises from the proximity of the switching pulse and video lines, and from the gate-to-drain capacitance of the MOS switches. Certain processing of the video signal at the single video output has been suggested wherein signal filtering is done to remove the switching pulse component from the video signal. However, these techniques require a significant amount of circuitry and slow down the rate at which the photocell information can be extracted from the array. It will be recognized that in applications such as in character readers, the speed of signal extraction from the array of photocells is critical, for it determines how fast the array may be scanned over a document to be read with a given resolution.

Therefore, it is a primary object of the present invention to provide a video signal extraction technique and electronic circuit implementation that minimizes the number of circuit components, primarily those that act on the analog-video signal, and which operates at a higher speed than other available extraction techniques.

It is also an object of the present invention to provide such a technique that is operable over a wide range of incident illumination on the photodetectors.

It is yet a further object of the present invention to provide such a technique and circuit that may be operated a distance from the utilizing electronics in an electrically noisy environment.

It is also an object of the present invention to provide a high speed photodetector array video signal extraction technique that is especially adapted for a high speed optical character reader device.

SUMMARY OF THE INVENTION

Briefly, these and additional objects of the present invention are accomplished by a video extraction circuit that receives the output of a commercially available photodetector array of the type discussed above and which integrates that output for a fixed time period in association with each photodetector that straddles in time the beginning and end of the switching pulse applied to the MOS switch associated with that photodetector. The integrator is thus operable in an integrating mode from a time prior to the connection of a particular photodiode to the common video output line through its MOS switch and extends to a time after the photodiode has been disconnected from the video output line by its associated MOS device. The integrating capacitor of the integrator is thus imparted with charge during that portion of integrating cycle when the photodetector MOS switch is conductive, to a level proportional to the time integral of the luminous flux that has struck the photodetector since it was last sampled. The voltage across the integrating capacitor is sampled at a time after the photodetector MOS switch again becomes non-conductive. After such sampling, the integrating capacitor is discharged by an electronic switch and is then ready to receive information from the next photodetector in time sequence. By this technique, the undesirable portion of the MOS switching signal that appears in the video output line is transferred in its entirety to the output of the integrator in a manner that does not affect the value of the photodetector video signal level appearing at the output of the integrator.

The signal output of the photoarray circuit chip is preferably applied directly to the integator without any other circuit element there between in order to keep the number of circuit elements required as low as possible for economy and to maintain speed of response of the overall circuit. Because the maximum charge deliverable by a photodetector is quite low, the integrating capacitor is required to be small in order that the voltage output of the integrator be sufficient to drive directly an analog-to-digital converter without any amplification or other circuit elements being required, except for a necessary $\times$ 1 buffer amplifier at the output of the integrator to prevent undue loading of the integrator by the analog-to-digital converter. The analog-to-digital converter preferably employs a Gray-code type converter with a digital output that is then utilized in later character recognition processing circuits. The video extraction circuit as well as the photodetector array are physically transported by the scanning head in an optical character reader apparatus embodiment with transmission of the digital output of the scanning head being through conductors of significant length to the character recognition unit. The digital format adopted for signal transmission results in excellent noise immunity in an electrically noisy environment.

Additional objects, advantages and features of the present invention will become apparent from the following detailed description of a preferred embodiment thereof which should be taken in conjunction with accompanying drawings.

DESCRIPTION OF THE PREFERRED EMBODIMENT

Figure 1:
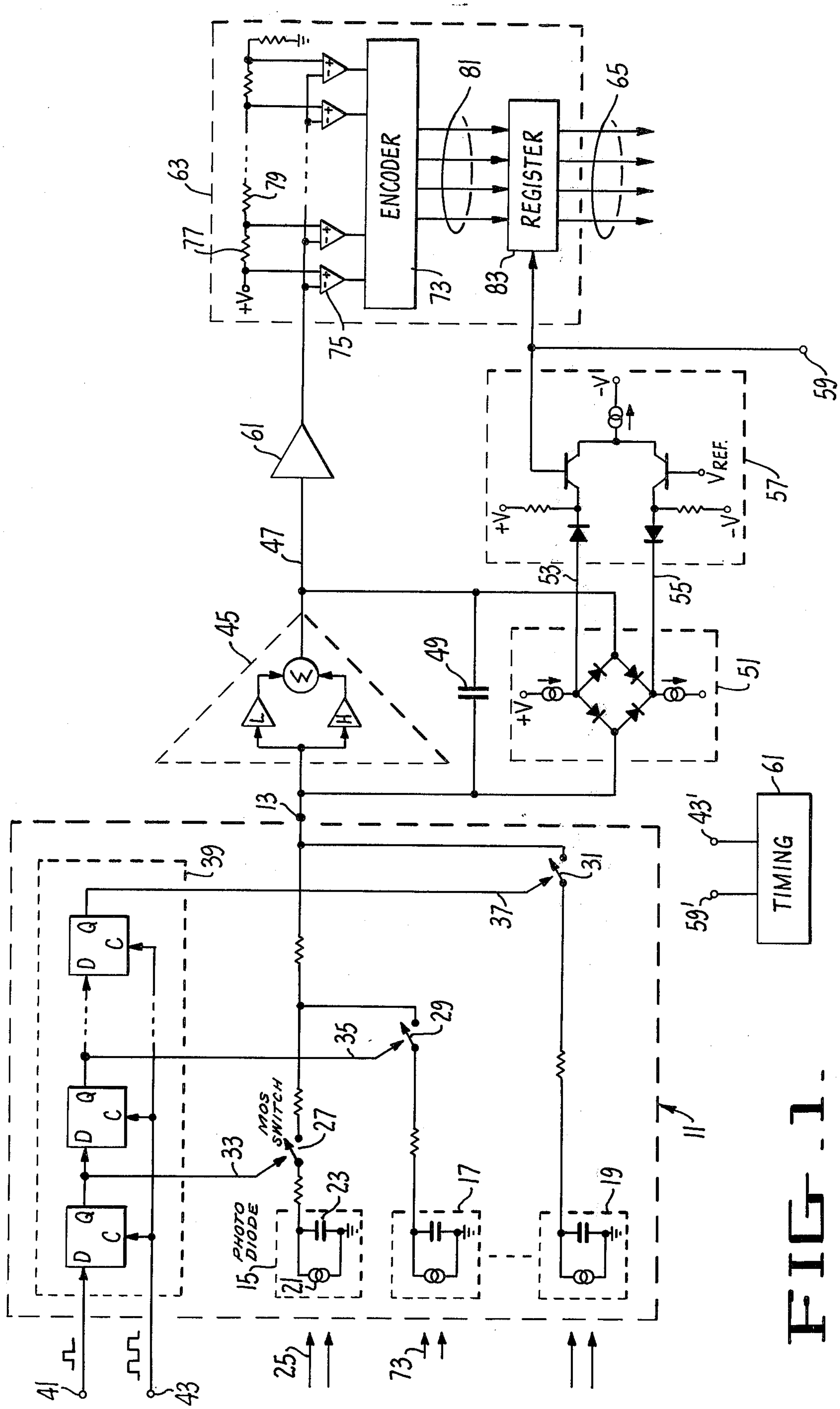
FIG. 1 schematically illustrates the video signal extraction circuitry according to the present invention when utilized with a commercially available photodetector array.

Referring to FIG. 1, a photoarray circuit 11 is illustrated generally in the form commercially available such as the Reticon RL-128L device mentioned above. The signal video output is at a terminal 13 from the commercialy available photoarray device 11. The photoarray device 11 includes a plurality of individual photodiodes, such as the 128 district diodes in the specific example being described. Three of these photodiodes 15, 17 and 19 are illustrated in an equivalent circuit form in FIG. 1. For instance, the photodiode 15 is shown to have a current generator 21 in parallel with a capacitance 23. The current generated by the current generator 21 is directly proportional to the luminous flux 25 that is incident thereon. This photocurrent from the current generator 21 flows through the capacitor 23 to charge it to a voltage dependent upon the level of such current and upon the time during which it flows. Such photocurrent generation is due to the mechanism of electron-hole pair generation under influence of incident light within the photodetector diode depletion region. The capacitor 23 results from a reversed biased silicon diode junction. The equivalent circuit described with respect to the photodiode 15 is typical of each diode of the linear array of photodiodes.

Each of the photodiodes has an MOS switching element in its output line to connect it in turn to the single video signal output terminal 13 at controlled times. The MOS switch is illustrated at 27 at the output of the photodiode 15, at 29 for the photodiode 17 and at 31 for the photodiode 19. Each of these semi-conductor switches is controlled, respectively, by signals applied to their gate circuits 33, 35 and 37. When the proper gate signal exists in one of the gate control lines 33, 35 or 37, the respective MOS switch becomes conductive and connects its associated photodiode to the common video signal output terminal 13.

The photodiode output MOS switches are rendered conductive one at a time under the control of a shift register 39. A start pulse introduced at a terminal 41 is advanced along the individual flip-flop stages of the shift register 39 one stage at a time in response to a clock signal applied to a terminal 43.

Figure 2:
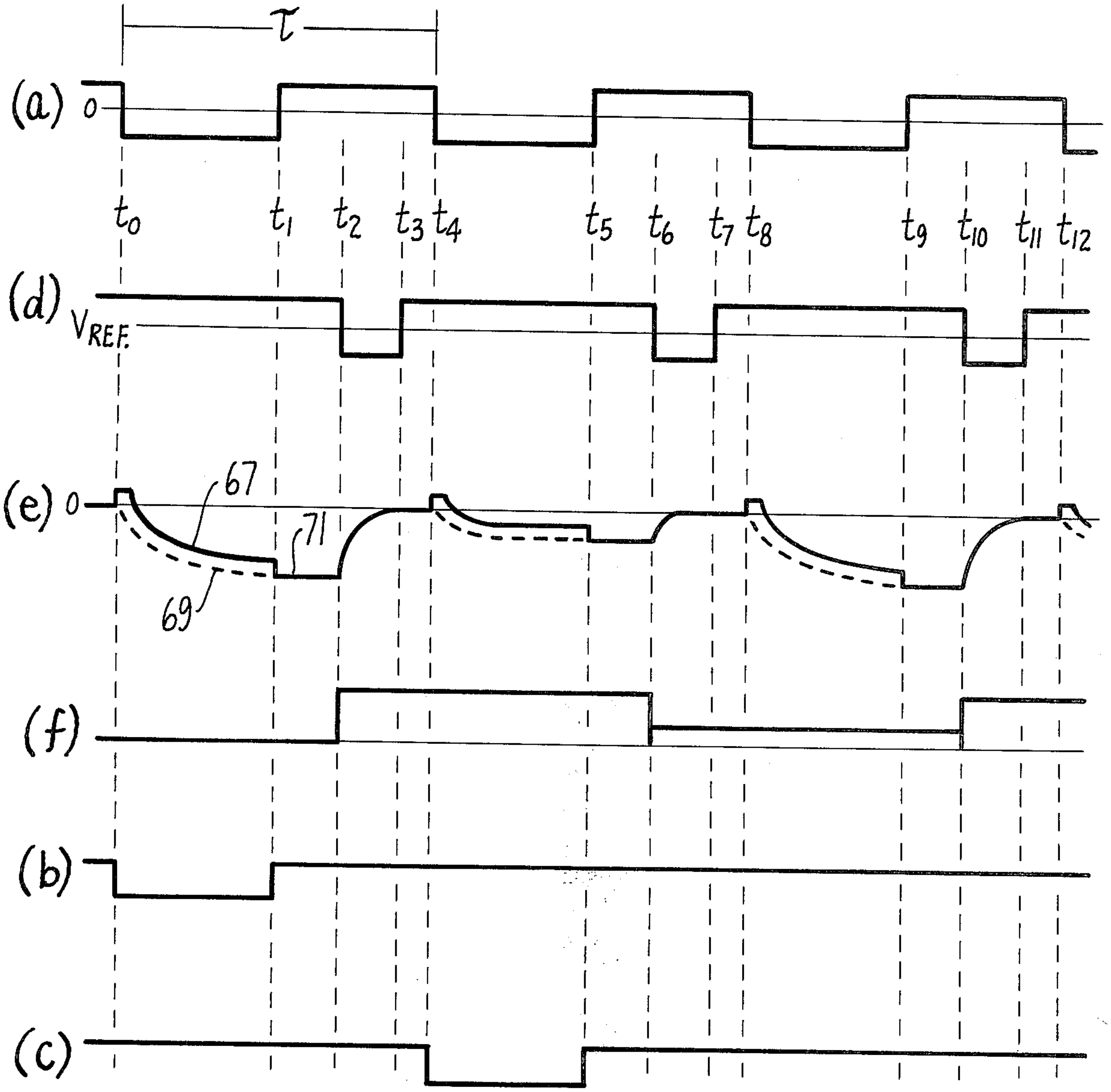
FIG. 2 is a timing diagram which shows waveforms at certain points in the circuit diagram of FIG. 1.

FIG. 2 illustrates a timing diagram of the circuit of FIG. 1. FIG. 2*a* is a rectangular wave having a period $\tau$. This is the clock signal applied at the terminal 43 in FIG. 1. FIG. 2*b* illustrates one form of the gating signal in the line 33 wherein the switch 27 is turned on during the negative going pulse. It will be noted that the gating signal pulse of FIG. 2*b* in the line 33 is coincident with the negative going portion of the clock pulse of FIG. 2*a* in the particular example. FIG. 2*c* illustrates the gating pulse in the line 35 for the switch 29. This occurs during the next negative cycle of the gate pulse of FIG. 2*a* that follows. It will be noted that successive output switches of the various photodiodes are turned on one at a time in succession, only two being illustrated in detail with respect to the waveforms of FIG. 2. During the positive portion of the clock signal of FIG. 2*a*, none of the photodiodes are connected to the common video signal output terminal 13; that is, none of the photodiode output switches receives a gating signal during the positive portion of the clock signal illustrated in FIG. 2*a*.

The photoarray device 11 includes a number of resistances as shown in FIG. 1 which are parasitic in nature; that is, they are undesirable resistances but exist as an unavoidable consequence of the physical realization of the device. As will become clear hereinafter, it is desirable that such resistances be minimized, but the available photoarray devices have rather substantial resistive parasitics. Parasitic capacitance, primiarly capacitive coupling in the MOS switching devices 27, 29, 31, etc., couples the gating pulse signals in the gate lines 33, 35, 37, etc., to the video output 13. This effect arises due to the non-zero gate-to-source and drain capacitances of the switch. The problem that this invention principally solves is extracting the video signal levels from the photodiodes of the photoarray 11 in sequence from the output terminal 13 without being affected by the capacitive and resistive parasitics that are present in the photoarray 11.

The signal of the terminal 13 is applied to the input of an operational integrating circuit which includes a high gain amplifier 45 having an output 47 and a capacitor 49 connected between the output 47 and the input to the amplifier 45. A semi-conductor switching circuit 51 connected across the capacitor 49 is capable of short-circuiting that capacitor in response to a reset control signal that is applied to the switch 51 through lines 53 and 55. This control signal is developed in a circuit 57 in response to a reset pulse at a terminal 59. The reset pulse is illustrated in FIG. 2*d* for the specific embodiment being described. Timing circuits 61 develop the clock signal of FIG. 2*a* at a terminal 43′ and the reset pulse of FIG. 2*d* at a terminal 59′ according to conventional techniques. In an optical character reader embodiment wherein the present video extraction technique and circuit is specifically utilized, the timing circuit 61 is part of a general purpose computer which controls the operation of the scanning mechanism. In such a specific embodiment, a general purpose computer also applies the start pulse to the terminal 41 which initiates the line-scan action in the photoarray. It will be noted that once the start pulse applied to the terminal 41 in FIG. 1 has advanced to the last flip-flop of the shift register 39, the photodiode scanning ends until a new start pulse is subsequently applied to the terminal 41.

The voltage output signal in the line 47 at the output of the integrating circuit is passed through a unity-gain buffer amplifier 61 of unity gain which is provided so that subsequent circuits do not load the integrating amplifier 45. The output of the buffer amplifier 61 is applied to an analog-to-digital converter 63. The analog signal input from the output of the buffer 61 is converted by the circuit 63 to a five bit digital signal in line 65. All of the circuitry illustrated in the FIG. 1, except for the timing circuit 61, is attached to a scanning head in the specific optical character reader embodiment. The scanning head travels in two dimensions with respect to a stationary document being read. The digital output line 65 travels through a very noisy environment to subsequent processing circuits through long flexible leads which permit travel of the scanning head over a rather large two dimensional area.

Referring to FIG. 2, the operation of the circuit of FIG. 1 is illustrated. At time $t_0$, the switch 27 is turned on by the initiation of a gate signal in the line 33 as illustrated in FIG. 2*b*. This permits the capacitor 49 to charge in a manner illustrated in FIG. 2*e* which is the voltage output in the line 47 at the output of the integrating circuit. At time $t_1$, the switch 27 opens again and the voltage of the capacitor 49 holds as a valve proportional to whatever charge was imparted thereto. The exponentially increasing voltage 67 at the output line 47 of the integrator circuit is a result of a charge being transferred from an equivalent circuit capacitance 23 of the photodiode 15 to the integrating capacitance 49. All of the charge of the photodiode will be so transferred provided the time period between $t_0$ and $t_1$ is sufficient, this time being made many times greater than the time constants of the circuit. The duration of this time is thus made so low as the parasitic resistances of the photoarray circuit 11 will permit. The voltage increase 67 is also affected by the gate voltage in the line 33, a dotted line 69 being shown in FIG. 2*e* to show what this voltage would be without the undesired transfer of the gating signal to the output 13. However, it will be noted from FIG. 2*e* that at time $t_1$ when the gating signal in the line 33 terminates and no other gating signal has yet been applied that the output in the line 47 jumps to a value 71 that is not affected by this noise. It is in the interval of $t_1$ to $t_2$ before the reset pulse of FIG. 2*d* is applied to the capacitor 49 that the output voltage in the line 47 as illustrated in FIG. 2*e* is sampled. This sampling is accomplished by the leading edge of the reset pulses of FIG. 2*d* by application thereof from the terminal 59 to the analog-to-digital converter 63.

From times $t_2$ to $t_3$, the reset pulse in the line 59 turns on the switch 51 and discharges the capacitor 49. This establishes the initial conditions in the integrator circuit and prepares it to leave the output of the next diode in the photoarray. The time required for this discharge operation is controlled by the value of the resistance of the switch circuit 51 when in its conductive state, this resistance being made as low as possible in order to speed up operation of the circuit.

From the time $t_3$ at the end of the reset pulse until time $t_6$, the integrating circuit is again receiving the signal at the terminal 13. Until one of the MOS switches is closed, however, there is no signal at terminal 13, thus the integrator output 47 is quiescent at the value established by the previous reset operation. The switch closing occurs at time $t_4$ when the gate signal in the line 35 as illustrated in FIG. 2*c* goes negative, thereby closing the MOS switch 29. It is assumed that the intensity of light 73 which is incident upon the photodiode 17 is less than the intensity of the light 25 which was incident on the photodiode 15. This could be due, for instance, to the photodiode 17 observing a black mark on a paper being scanned while the photodiode 15 had observed a light area. The result under the assumed circumstances is that the output waveform illustrated in FIG. 2*e* is the same between time periods $t_4$ through $t_8$ as discussed above with respect to the time period of $t_0$ through $t_4$ except for the amplitude of that signal. Similar output waveforms result in the line 45 in subsequent repetitive periods of time as all of the photodiodes of the array 11 are scanned. When they are all scanned, the signal level in the line 47 is zero until a new start pulse is applied to the terminal 41 at which time the procedure is repeated again.

It will be noted, therefore, that the time that the integrating circuit is operable starts before and extends beyond the end of its associated MOS gate signal. For instance, with respect to FIG. 2, it will be noted that the integrating circuit is operable between reset pulses, such as between the times $t_3$ and $t_6$, while the control signal applied to the gate of the MOS switch which is connected to the integrator during that period only extends from the time $t_4$ to $t_5$. The integrating time thus straddles the negative cycle of the clock signal of FIG. 2*a* which is also the duration of the MOS gating pulse. This results in passing the scaled version of the switching signal directly to the output line 47, and hence as a signal in the line 47 that is insensitive to the parasitic coupling of the MOS switching pulses in the video line 13. So long as the gating pulses as illustrated in FIG. 2*b* and *c* departs from and returns to the same value, the final signal value in the line 47 will be independent of the shape and peak value of the gating signals.

The analog-to-digital converter 63 preferably includes a Gray-code type of encoder 73 with a plurality of input lines in which outputs of a plurality of comparators, such as a comparator 75, are connected. The inverting input of each of the plurality of comparators is connected in common to the output of the buffer amplifier 61. The non-inverting input of each of the comparators of the converter 63 is connected to a slightly different reference potential which is derived from a long voltage divider circuit including resistances 77, 79, etc. A digital output in the lines 81 follows analog signal in the line 47 as illustrated in the FIG. 2*e*. Staticising register 83 receives this digital signal from the lines 81 and transfers it to the output lines 65 at a time coincident with the leading edge of each reset pulse at the terminal 59. Referring to FIG. 2, it can be seen that this transfer by the register 83 occurs at times $t_2$, $t_6$ and $t_{10}$ at the leading edge of the reset pulses of FIG. 2*d*. This results in an output in the line 65 represented schematically by analog bars of FIG. 2*f*. This signal is held in the line 65 until the next reset pulse leading edge occurs at which time it is updated. By sampling the output of the integrator just before it is reset, the output of the integrator has had a maximum time to settle to its final value.

In order to maximize the simplicity and speed of operation of the circuit in FIG. 1, certain specific forms for the integrating amplifier 45, reset discharge switch 51 and switch driving circuit 57 are preferred. The integrating amplifier 45 must be of a type capable of settling to its final output value within a short period for fast circuit operation. The amplifier must also possess a very low input bias current, and must be of a reasonably high gain in order to keep the summing junction at its input virtually at zero volts during operation. One amplifier form that satisfies these criteria is illustrated in FIG. 1 wherein two separate amplifiers are connected in parallel, one of the amplifiers being responsive to low frequency components of the input signal and the other being responsive to high frequency components. Thus, these amplifiers may be optimised for best performance in their respective frequency ranges. The outputs of these two amplifier circuits are then summed together to form the composite output in the line 47. Such a parallel path amplifier circuit is generally known in the art for other applications.

The integrator reset switch 51 is constructed in a preferred form with matched hot carrier diodes which each have the essential prerequisite for this application of negligible stored charged and low junction capacitance. The switch 51 is driven by a high speed non-saturating current-routing transistor pair as part of the driving circuit 57. This circuit generates the symmetrical bi-polar voltage drive required by the switch 51. The switch circuit 51 and driving circuit 57 as illustrated in detail in FIG. 1 are generally known in the art for other applications. Of course, other more conventional known circuits for the amplifier 45, switch 51 and switch driver 57 may be utilized by the particular combination illustrated in FIG. 1 has been found to permit extremely high speed video extraction from the photoarray.

It will be noted from FIG. 1 that the video output terminal 13 is coupled directly to the integrating circuit and that the integrating circuit 47 is coupled directly, except for the necessary unity-gain buffer 61, to the analog-to-digital converter 63. This minimizes the number of components which must operate upon the signal in the analog domain, thus presenting certain economies and, most importantly, permitting faster operation of the video extraction being performed since there are few components through which the signals must pass. This is highly desirable and permitted in part by the value of the capacitance 49 of the integrating circuit being made to be low with respect to the equivalent capacitance 23, etc., of the photodiode elements. In the particular Reticon RL 128L array 11 utilized, the maximum charge that is storable in the capacitance at the semi-conductor junction is about 6 picocoulombs. The value of the capacitor 49 may be 12 picofarads in a workable embodiment of the circuit of FIG. 1. That means that maximum voltage output in the line 47 is one-half volt when the capacitance of a photodiode is fully charged. A swing of zero to one-half volt in the line 47, depending upon the light incident upon the photodector within the array 11, is quite satisfactory to drive the analog-to-digital converter 63, thus eliminating the necessity for any pre-amplification prior to the integrator or post-amplification between the integrator and the converter 63. In a particular form, the number of inputs to the encoder 73 is 16, there being 16 comparators such as the comparator 75. The voltages applied to the non-inverting input of the comparators range from 16 millivolts at the lowest and continue in 16 millivolt steps to 0.492 volt. This will handle the possible zero to 0.5 output in the line 47 and gives a high resolution digital signal in the output lines 81 of the encoder 73. A 12 pico-farad value for the capacitance 49 is sufficiently high that the output voltage resulting is not affected significantly by parasitic capacitance within the circuits.

In the improved video signal extraction circuit of FIG. 1, the clock period $\tau$ as illustrated in FIG. 2*a* may be, in the specific example with the various values discussed above, equal to 500 nano-seconds. That means that the time required to scan an array of 128 photocells is only 64 microseconds. This high speed permits rapid movement of the photocell array over a document to be read, a primary desirable result. For such a clock period of 500 nano-seconds, the time in FIG. 2 between $t_0$ and $t_1$ is chosen as 250 nano-seconds. The time between $t_1$ and $t_2$ is approximately 100 nanoseconds, between $t_2$ and $t_3$ approximately 100 nanoseconds, and between $t_3$ and $t_4$ approximately 50 nanoseconds.

The various aspects of the present invention have been described with respect to a preferred embodiment and in even more detail with respect to a specific valued circuit. Of course, it will be understood that the various aspects of the present invention are entitled to protection within the full scope of the appended claims.

I claim:

1. A video signal extraction circuit for use with a photodetector device having an array of individual photodetectors that are each connected to a common video output line through an individual semi-conductor element that is switchable from a normal non-conductive state to a conductive state for the duration of a gate signal and means applying the gate signal to each of said semi-conductor elements one at a time to render them each conductive for prescribed intervals with time therebetween when none of the semi-conductor elements are conductive, said video extraction circuit comprising:

an integrator circuit having an input receiving a signal from the common video output line and an output, and means for resetting the integrator circuit during each period wherein none of the semi-conductor elements is conductive, in a manner that the integrator circuit is operative for a time between reset pulses that extends throughout each of said gate signals from an instant before to an instant after each of said gate signals.

2. The video signal extraction circuit according to claim 1 which additionally comprises means for sampling said integrator output immediately preceding each of said integrator reset pulses but after the end of each said gating pulses.

3. The video signal extraction circuit according to claim 2 wherein said means for sampling the integrator output includes a Gray-code analog-to-digital encoder, whereby the output of said circuit is a Gray-code binary signal.

4. The video signal extraction circuit according to claim 1 wherein said integrating circuit includes a high gain amplifier with a capacitor connected from its output to its input, said amplifier having parallel amplification paths with one path responsive to low frequencies and the other path responsive to high frequencies, said paths being summed together to form said integrating circuit output after amplification thereof.

5. The video signal extraction circuit according to claim 1 wherein said integrator resetting means includes a semi-conductor switch employing a balanced bridge of matched hot carrier diodes.

6. The video signal extraction circuit according to claim 1 wherein said integrator circuit input is connected directly to the common video output line of the photodetector device without any active electronic elements being interposed therein.

7. The video signal extraction circuit according to claim 1 wherein said integrator circuit output is connected directly to an analog-to-digital converter with only a unity gain buffer amplifier interposed therebetween.

* * * * *